(12) United States Patent
Yuki (10) Patent No.: US 11,806,655 B2
(45) Date of Patent: Nov. 7, 2023

(54) HONEYCOMB FILTER

(71) Applicant: NGK Insulators, Ltd., Nagoya (JP)

(72) Inventor: Kazuya Yuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 301 days.

(21) Appl. No.: 17/157,055

(22) Filed: Jan. 25, 2021

(65) Prior Publication Data

US 2021/0291101 A1    Sep. 23, 2021

(30) Foreign Application Priority Data

Mar. 19, 2020   (JP) .................................. 2020-049072

(51) Int. Cl.
*B01D 46/24* (2006.01)
*B01D 53/94* (2006.01)
(Continued)

(52) U.S. Cl.
CPC ......... *B01D 46/247* (2013.01); *B01D 46/249* (2021.08); *B01D 46/2474* (2013.01);
(Continued)

(58) Field of Classification Search
None
See application file for complete search history.

(56) References Cited

U.S. PATENT DOCUMENTS

2006/0057046 A1* 3/2006 Punke ................. B01J 37/0248
                                                              422/177
2011/0123421 A1* 5/2011 Grubert ................. F01N 3/035
                                                              422/177
(Continued)

FOREIGN PATENT DOCUMENTS

DE    10 2017 106 374 A1    10/2017
DE    10 2019 204 505 A1    10/2019
(Continued)

OTHER PUBLICATIONS

German Office Action (Application No. 10 2021 106 062.1) dated Mar. 9, 2022 (with English translation).
Japanese Office Action (with English translation) dated Aug. 15, 2023 (Application No. 2020-049072).

*Primary Examiner* — Elizabeth Collister
(74) *Attorney, Agent, or Firm* — BURR PATENT LAW, PLLC (57) ABSTRACT

A honeycomb filter includes a pillar-shaped honeycomb structure body having a porous partition wall disposed to surround a plurality of cells and a plugging portion, wherein the partition wall defining inflow cells includes partition wall parts making up sides of polygon that is sectional shape of each cell, the partition wall parts each having a surface that is a face defining the inflow cell, the partition wall part is either a first partition wall part loaded with the exhaust-gas purifying catalyst on the surface so that a percentage of the area loaded therewith exceeds 10%, or a second partition wall part loaded with the exhaust-gas purifying catalyst so that a percentage of the area loaded therewith is 10% or less, and the partition wall is configured to include one or more the first partition wall parts and one or more the second partition wall parts as the partition wall parts.

4 Claims, 7 Drawing Sheets

(51) Int. Cl.
    *B01J 35/04*     (2006.01)
    *B01J 20/28*     (2006.01)
    *B01J 20/16*     (2006.01)
    *F01N 3/28*     (2006.01)
    *F01N 3/022*     (2006.01)
    *B01D 46/82*     (2022.01)

(52) U.S. Cl.
    CPC ..... *B01D 46/2476* (2021.08); *B01D 46/2484* (2021.08); *B01D 46/2486* (2021.08); *B01D 46/2492* (2021.08); *B01D 46/2494* (2021.08); *B01D 46/82* (2022.01); *B01D 53/94* (2013.01); *B01J 20/16* (2013.01); *B01J 20/28045* (2013.01); *B01J 35/04* (2013.01); *F01N 3/0222* (2013.01); *F01N 3/2803* (2013.01); *B01D 2255/9155* (2013.01); *B01D 2255/9207* (2013.01); *B01D 2279/30* (2013.01); *F01N 2330/02* (2013.01)

(56) References Cited

U.S. PATENT DOCUMENTS

| | | |
|---|---|---|
| 2014/0154146 A1 | 6/2014 | Aoki |
| 2015/0033691 A1* | 2/2015 | Shibata .............. B01D 46/2494 55/529 |
| 2017/0284247 A1 | 10/2017 | Kadoya et al. |
| 2017/0298797 A1* | 10/2017 | Onoe ...................... F01N 3/035 |
| 2018/0280860 A1* | 10/2018 | Yasui .................. B01D 46/247 |
| 2019/0301325 A1 | 10/2019 | Yoshioka et al. |
| 2019/0301327 A1 | 10/2019 | Yoshioka et al. |
| 2020/0368735 A1 | 11/2020 | Sugiura et al. |

FOREIGN PATENT DOCUMENTS

| | | |
|---|---|---|
| DE | 10 2019 204 520 A1 | 10/2019 |
| DE | 10 2020 110 011 A1 | 11/2020 |
| JP | 2010-221189 A1 | 10/2010 |
| JP | 2014-108404 A | 6/2014 |
| JP | 2015-164712 A1 | 9/2015 |

* cited by examiner

HONEYCOMB FILTER

The present application is an application based on JP 2020-049072 filed on Mar. 19, 2020 with Japan Patent Office, the entire contents of which are incorporated herein by reference.

BACKGROUND OF THE INVENTION

Field of the Invention

The present invention relates to honeycomb filters. Specifically, the present invention relates to a honeycomb filter capable of effectively suppressing peel-off of the trapped particulate matter such as soot from the surface of the partition wall.

Description of the Related Art

Exhaust gas emitted from various types of internal combustion engine, such as a diesel engine, contains a lot of particulate matters, such as dust, soot and carbon particulates. Diesel Particulate Filter (DPF) is therefore used as a purification device to purify exhaust gas emitted from an automobile including a diesel engine as the power source, for example. Hereinafter, particulate matters may be referred to as "PM", and Diesel Particulate Filter may be referred to as "DPF".

Conventionally a honeycomb filter having a honeycomb structure has been known as DPF (see Patent Documents 1 and 2). A honeycomb structure includes a partition wall made of porous ceramics, such as cordierite or silicon carbide, and this partition wall defines a plurality of cells. A honeycomb filter includes such a honeycomb structure provided with a plugging portion so as to plug the open end at the inflow end face side and the outflow end face side of the plurality of cells alternately.

Continuous removal of PM in exhaust gas with the DPF causes the accumulation of the PM such as soot inside the DPF, and so the purifying efficiency of the DPF deteriorates and the pressure loss in the DPF increases. Such a purification device including DPF therefore undergoes "regeneration processing", for example, and in this processing, the PM accumulated inside the DPF are burned.

Examples of the regeneration processing of DPFs include "continuous regeneration" and "forced regeneration" as described below. "Continuous regeneration" generates $NO_2$ from the NO in exhaust gas with oxidation catalyst, and continuously burns the soot accumulated inside DPF with this $NO_2$ as oxidant. "Forced regeneration" forcibly burns the soot accumulated inside DPF by post injection or injection into exhaust pipe, for example. For continuous regeneration of DPF, the DPF may be loaded with oxidation catalyst and the like to purify exhaust gas. The catalyst acts to enable the continuous regeneration at relatively low temperatures.

[Patent Document 1] JP-A-2015-164712
[Patent Document 2] JP-A-2010-221189

SUMMARY OF THE INVENTION

Conventional honeycomb filters used as DPF have a problem of clogging the cells with soot accumulated on the surface of the partition wall of the honeycomb structure depending on the usage or the environment of use, and so increasing pressure loss of the honeycomb filter. In particular, a honeycomb filter loaded with catalyst at the partition wall for continuous regeneration as described above often has clogging of the cells, because soot easily peels off from the surface of the partition wall due to a contact of the soot with the catalyst, and the soot peeling off from the surface of the partition wall gathers as a mass.

In one example, conventional honeycomb filters generate the peeling-off of soot trapped at the surface of the partition wall through the following events. FIG. 10 schematically shows the process of generating peeling-off of the soot trapped at the surface of the partition wall and clogging a cell with the soot. In FIG. 10, (a) to (d) show the process of clogging the cell in sequence. In (a) to (d), the drawing on the left is an enlarged section orthogonal to the extending direction of the cells, and the drawing on the right is an enlarged section parallel to the extending direction of the cells.

Figure 10A:
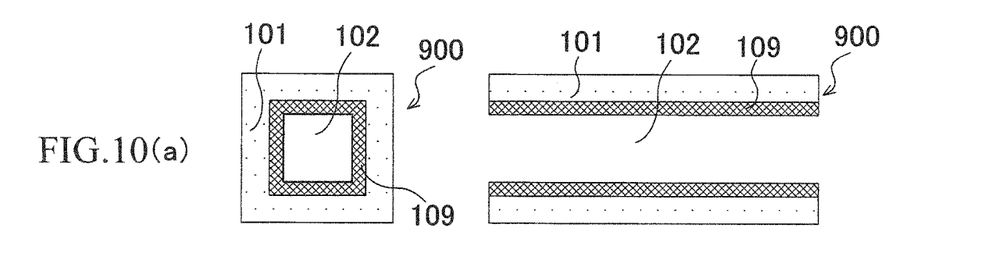
Figure 10B:
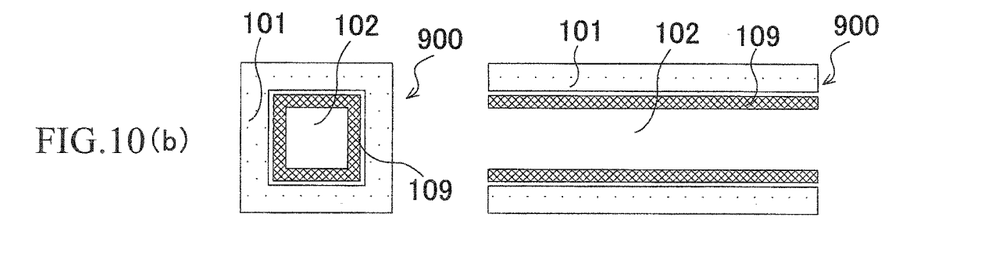
Figure 10C:
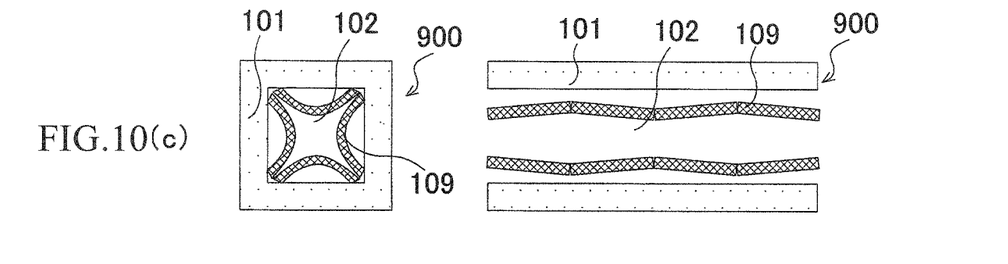
Figure 10D:
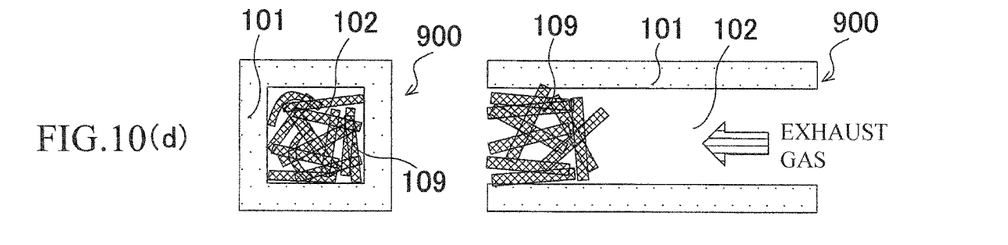

As shown in FIG. 10(a), when the exhaust gas is purified with a partition wall 101 of a honeycomb filter 900, soot 109 accumulates on the surface of the partition wall 101 defining a cell 102 serving as a flow channel of the exhaust gas. In response to such accumulation of the soot 109 on the surface of the partition wall 101, continuous regeneration with the catalyst loaded at the partition wall 101 burns the soot 109 accumulated on the surface of the partition wall 101 as shown in FIG. 10(b). Combustion of the soot 109 in continuous regeneration proceeds mainly at a part in contact with the catalyst. If a large amount of soot 109 accumulates on the surface of the partition wall 101, a part of the soot 109 in the surface side of the partition wall 101 is burned, and this forms a gap in the soot 109 after burning, so that unburned soot 109 may be left via the gap. Such unburned residue of soot 109 floats from the partition wall 101, and so easily peels off from the surface of the partition wall 101. In addition, exhaust gas emitted from a diesel engine and the like contains water vapor, and condensed water may be generated by cooling, for example. When the soot 109 contracts due to such condensed water, the soot 109 floating from the partition wall 101 peels off more easily. For example, as shown in FIG. 10(c), when the soot 109 floating from the partition wall 101 contracts, the contracted soot 109 will crack. When the soot 109 is generated cracking, the smashed soot 109 due to cracking is pushed toward the rear end of the honeycomb filter 900 by the exhaust gas flowing through the cell 102, so that the cell 102 is clogged with the soot 109, as shown in FIG. 10(d).

In view of such problems of the conventional techniques, the present invention provides a honeycomb filter capable of effectively suppressing peeling-off of particulate matter, such as trapped soot, from the surface of the partition wall.

The present invention provides the following honeycomb filter.

[1] A honeycomb filter including: a pillar-shaped honeycomb structure body having a porous partition wall disposed so as to surround a plurality of cells, which serve as fluid through channel extending from an inflow end face to an outflow end face; and a plugging portion disposed so as to plug end at any one of the inflow end face side and at the outflow end face side of the cells, wherein
the cells each have a sectional shape that is a polygon in a section orthogonal to an extending direction of the cells of the honeycomb structure body,
the cells having the plugging portion at ends on the outflow end face side and that are open on the inflow end face side are inflow cells,
the cells having the plugging portion at ends on the inflow end face side and that are open on the outflow end face side are outflow cells, at least a part of a surface of the partition wall defining the outflow cells is loaded with exhaust-gas purifying catalyst, the partition wall defining the inflow cells includes a plurality of partition wall parts making up sides of the polygon that is the sectional shape of each cell, the partition wall parts each having a surface that is a face defining the inflow cell, the partition wall part is either a first partition wall part and a second partition wall part, the first partition wall part is loaded with the exhaust-gas purifying catalyst on the surface of the first partition wall part so that a percentage of a ratio of an area $S2$ of a range loaded with the exhaust-gas purifying catalyst to an area $S1$ of the surface of the first partition wall part exceeds 10%, the second partition wall part is not loaded with the exhaust-gas purifying catalyst on the surface of the second partition wall part, or is loaded with the exhaust-gas purifying catalyst so that a percentage of a ratio of an area $S4$ of a range loaded with the exhaust-gas purifying catalyst to an area $S3$ of the surface of the second partition wall part is 10% or less, and the partition wall defining each of the inflow cells is configured to include one or more the first partition wall parts and one or more the second partition wall parts as the partition wall parts.

[2] The honeycomb filter according to [1], wherein the partition wall making up sides of the polygon that is the sectional shape of each cell includes the partition wall defining two adjacent inflow cells.

[3] The honeycomb filter according to [1] or [2], wherein the honeycomb structure body has a repeating unit so that the cells having a quadrangular sectional shape and the cells having an octagonal sectional shape are alternately disposed via the partition wall, has a repeating unit of the cells having a hexagonal sectional shape, or has a repeating unit so that the four cells each having a hexagonal sectional shape surround the cell having a quadrangular sectional shape.

[4] The honeycomb filter according to [1] or [2], wherein the honeycomb structure body has a repeating unit so that the eight inflow cells are disposed so as to surround the outflow cell, the outflow cell having an octagonal sectional shape, the inflow cells each having a quadrangular or octagonal sectional shape.

A honeycomb filter of the present invention effectively suppresses peeling-off of particulate matter, such as trapped soot, from the surface of the partition wall. The honeycomb filter therefore prevents clogging of cells with particulate matter such as peeled soot. For continuous regeneration to continuously burn the soot accumulated inside a honeycomb filter, the honeycomb filter of the present invention keeps a desired regeneration efficiency. This means that also for continuing use, the honeycomb filter of the present invention effectively suppresses deterioration of the purifying efficiency and an increase in the pressure loss.

BRIEF DESCRIPTION OF THE DRAWINGS

FIGS. 10(*a*)-10(*d*) schematically show the process of generating peeling-off of the soot trapped at the surface of the partition wall and clogging a cell with the soot.

DESCRIPTION OF THE PREFERRED EMBODIMENTS

The following describes embodiments of the present invention, and the present invention is not limited to the following embodiments. The present invention is therefore to be understood to include the following embodiments, to which modifications and improvements are added as needed based on the ordinary knowledge of a person skilled in the art without departing from the scope of the present invention.

(1) Honeycomb Filter (First Embodiment)

Figure 1:
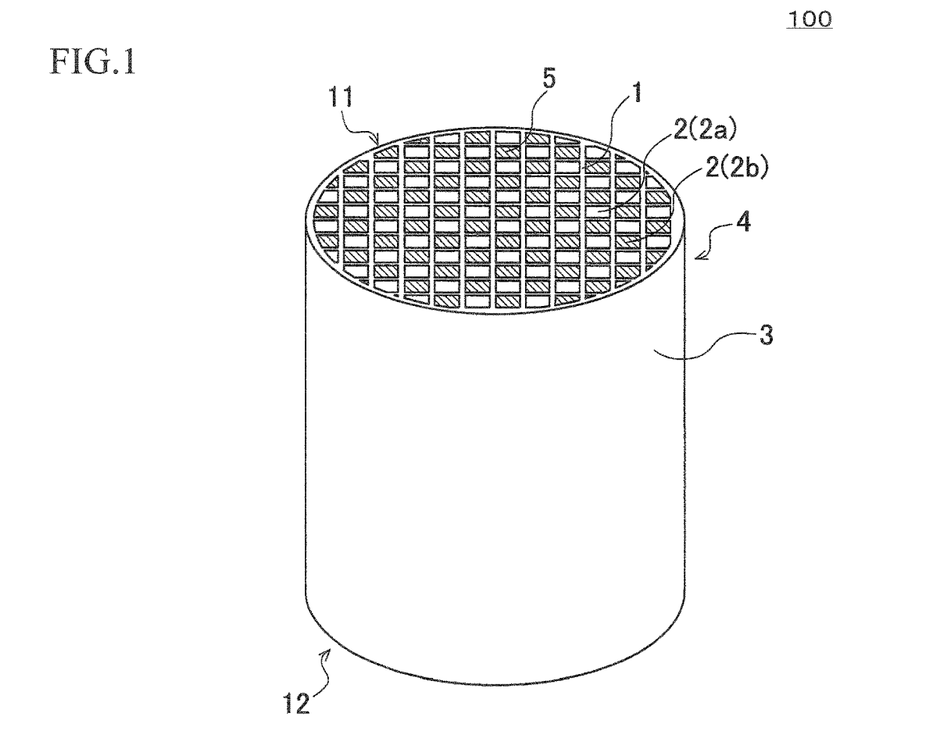
FIG. 1 is a perspective view schematically showing a first embodiment of a honeycomb filter of the present invention.
Figure 2:
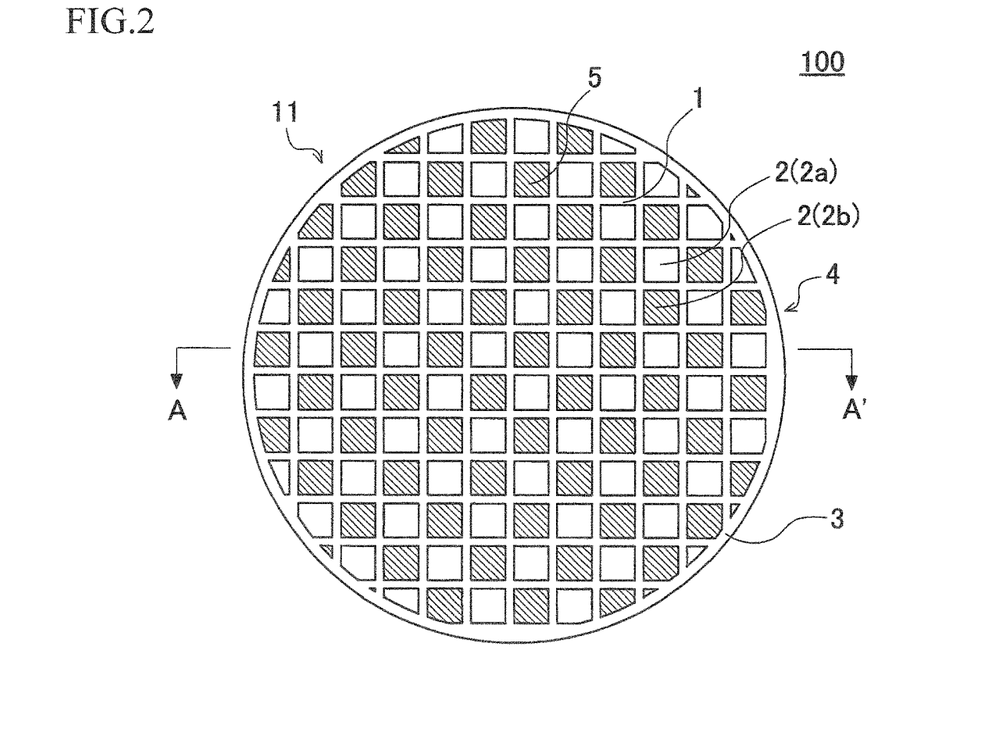
FIG. 2 is a plan view showing the inflow end face side of the honeycomb filter shown in FIG. 1.
Figure 3:
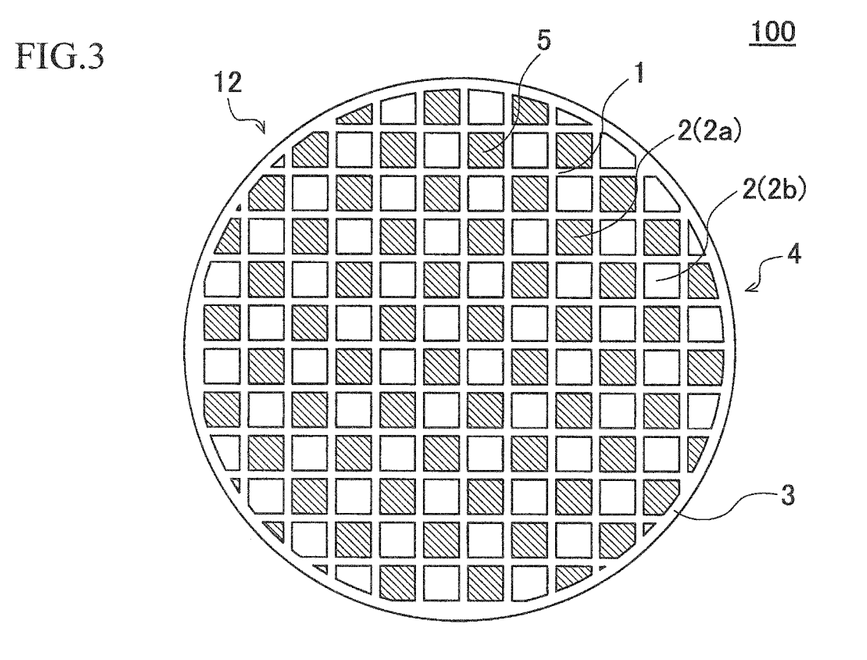
FIG. 3 is a plan view showing the outflow end face side of the honeycomb filter shown in FIG. 1.
Figure 4:
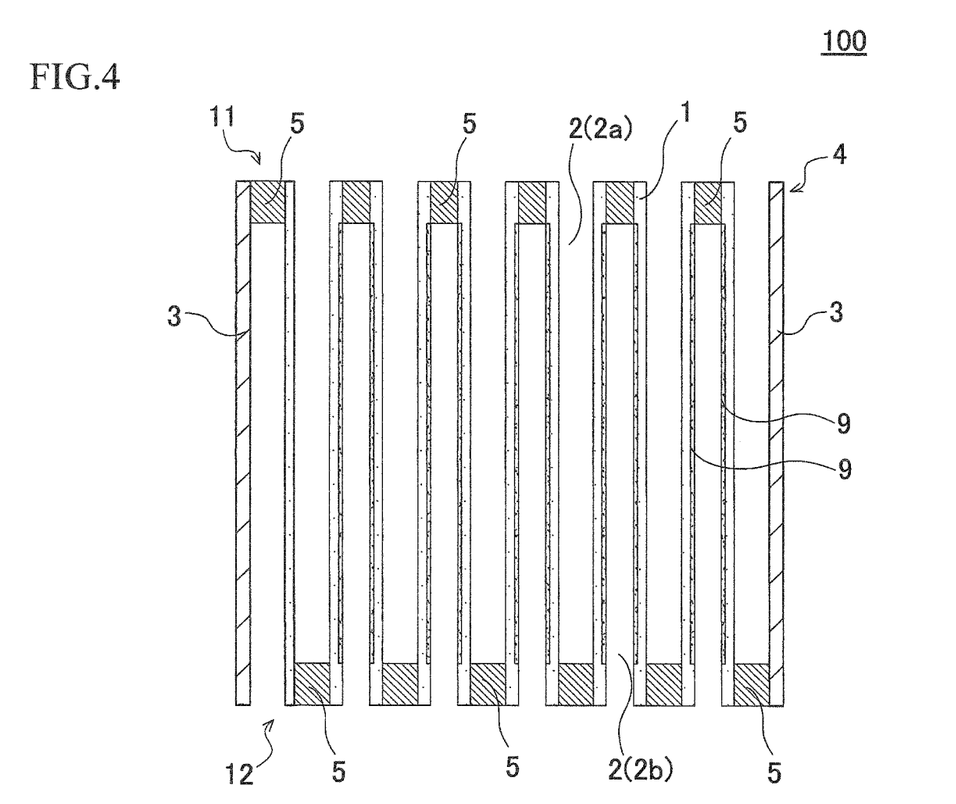
FIG. 4 is a sectional view schematically showing the section taken along the line A-A' of FIG. 2.
Figure 5:
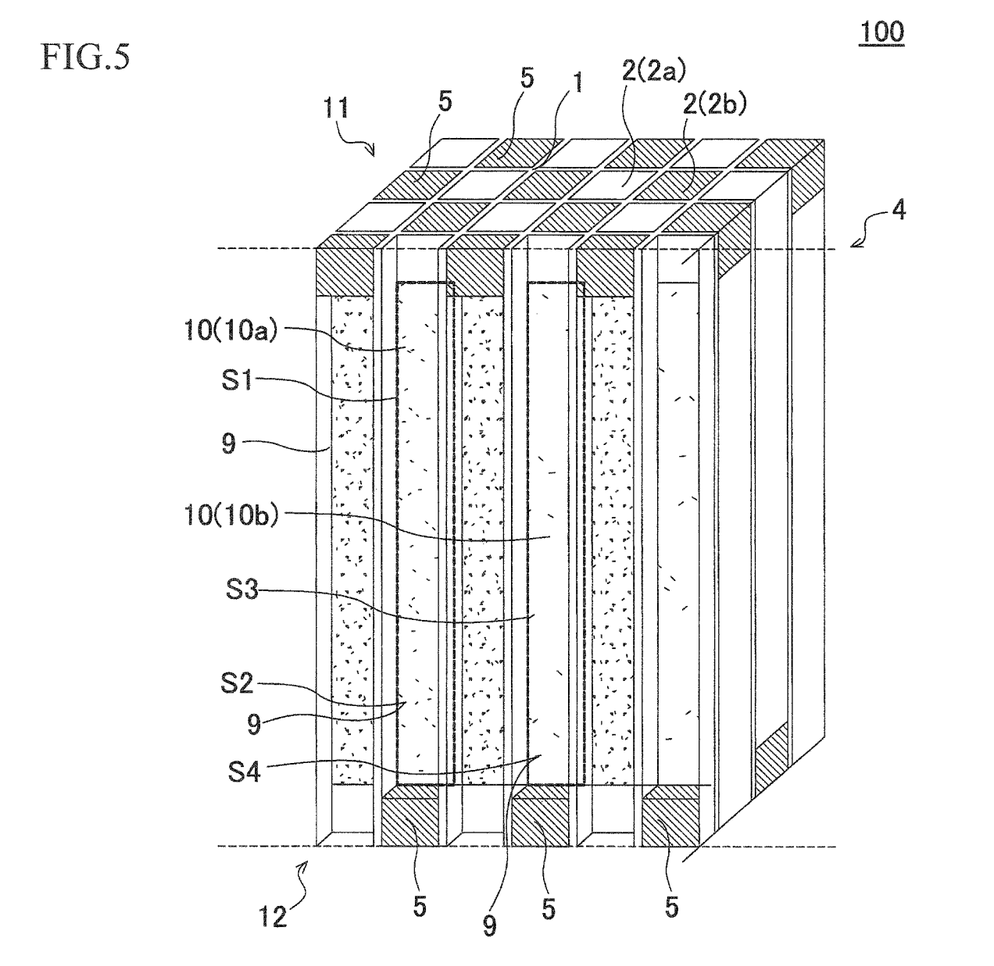
FIG. 5 is a partial perspective view for explaining the load state of catalyst at the honeycomb filter shown in FIG. 1.

A first embodiment of the honeycomb filter of the present invention is a honeycomb filter 100 as shown in FIGS. 1 to 5. FIG. 1 is a perspective view schematically showing the first embodiment of the honeycomb filter of the present invention. FIG. 2 is a plan view showing the inflow end face side of the honeycomb filter shown in FIG. 1. FIG. 3 is a plan view showing the outflow end face side of the honeycomb filter shown in FIG. 1. FIG. 4 is a sectional view schematically showing the section taken along the line A-A' of FIG. 2. FIG. 5 is a partial perspective view for explaining the load state of catalyst at the honeycomb filter shown in FIG. 1.

As shown in FIGS. 1 to 5, the honeycomb filter 100 includes a honeycomb structure body 4 and a plugging portion 5. The honeycomb structure body 4 has a porous partition wall 1 disposed so as to surround a plurality of cells 2, which serve as fluid through channel extending from the inflow end face 11 to the outflow end face 12 of the honeycomb structure body 4. The honeycomb structure body 4 is a pillar-shaped structure having the inflow end face 11 and the outflow end face 12 as both ends. In the present invention, the cells 2 refer to a space surrounded with the partition wall 1. Hereinafter, the "partition wall 1 disposed so as to surround the cells 2" may be referred to as "partition wall 1 defining the cells 2." The honeycomb structure body 4 of the honeycomb filter 100 further has a circumferential wall 3 on the circumferential side surface disposed to encompass the partition wall 1.

The honeycomb filter 100 is configured so that the cells 2 have a polygonal sectional shape in a section orthogonal to an extending direction of the cells 2 of the honeycomb structure body 4. Specific examples of the sectional shape of the cells 2 include a triangle, a quadrangle, a pentagon, a hexagon, and an octagon. In the honeycomb filter 100 shown in FIGS. 1 to 5, the sectional shape of the cells 2 is quadrangular.

The plugging portion 5 is disposed at any one of the end of the inflow end face 11 side and the outflow end face 12 side of the cells 2 to plug the open ends of the cells 2. The plugging portion 5 is porous made of a porous material (that is, a porous body). The honeycomb filter 100 shown in FIGS. 1 to 5 is configured to have predetermined cells 2 with the plugging portion 5 at the ends on the inflow end face 11 side and residual cells 2 with the plugging portion 5 at the ends on the outflow end face 12 side so that these predetermine cells and residual cells are disposed alternately via the partition wall 1. Hereinafter the cells 2 having the plugging portion 5 at the ends of the inflow end face 11 side may be called "outflow cells 2b". The cells 2 having the plugging portion 5 at the ends of the outflow end face 12 side may be called "inflow cells 2a".

In the honeycomb filter 100, a part of the surface of the partition wall 1 defining the cells 2 is loaded with an exhaust-gas purifying catalyst 9, and this honeycomb filter 100 has a particularly major configuration in the range loaded with this exhaust-gas purifying catalyst 9. Hereinafter, the range loaded with the exhaust-gas purifying catalyst 9 of the honeycomb filter 100 is described in detail.

Firstly, the partition wall 1 defining outflow cells 2b is configured so that at least a part of the surface of the partition wall 1 is loaded with the exhaust-gas purifying catalyst 9. For example, the entire surface of the partition wall 1 defining outflow cells 2b may be loaded with the exhaust-gas purifying catalyst 9, or a part of the surface of the partition wall 1 defining outflow cells 2b may be loaded with the exhaust-gas purifying catalyst 9. Whether or not the surface of the partition wall 1 is loaded with the exhaust-gas purifying catalyst 9 can be determined by a two-dimensional image analysis of the honeycomb filter 100 by X-ray CT, which will be described later.

The partition wall 1 defining inflow cells 2a is loaded with the exhaust-gas purifying catalyst 9 on the surface of the partition wall 1 while having a structure described below. To explain the load state of the exhaust-gas purifying catalyst 9 on the surface of the partition wall 1 defining inflow cells 2a, let that the partition wall 1 defining the inflow cells 2a includes a plurality of partition wall parts 10 making up the sides of the polygons that are the sectional shape of the cells 2. That is, the plurality of partition wall parts 10 are imaginarily divided parts of the partition wall 1 defining the inflow cells 2a. The plurality of partition wall parts 10 each have a surface that is a face defining the corresponding inflow cell 2a. In the honeycomb filter 100 shown in FIGS. 1 to 5, the sectional shape of the inflow cells 2a is quadrangular, and so four plate-shaped partition wall parts 10 surround an inflow cell 2a. These four plate-shaped partition wall parts 10 are the four sides of the quadrangle, and do not include the intersections of the adjacent partition wall parts 10.

Each partition wall part 10 making up the partition wall 1 defining the inflow cells 2a is a first partition wall part 10a or a second partition wall part 10b as described below. The partition wall 1 disposed so as to surround one inflow cell 2a is configured to include one or more first partition wall parts 10a and one or more second partition wall parts 10b as the partition wall parts 10.

The first partition wall part 10a is loaded with the exhaust-gas purifying catalyst 9 on the surface of the first partition wall part 10a so that a percentage of a ratio of an area S2 of a range loaded with the exhaust-gas purifying catalyst 9 to an area S1 of the surface of the first partition wall part 10a exceeds 10%. Hereinafter, the "percentage (%) of the ratio of the area S2 of the region loaded with the exhaust-gas purifying catalyst 9 to the area S1 of the surface of the first partition wall part 10a" may be called a "catalyst loading area ratio (%) of the first partition wall part 10a".

The second partition wall part 10b is not loaded with the exhaust-gas purifying catalyst 9 on the surface of the second partition wall part 10b, or is loaded with the exhaust-gas purifying catalyst 9 on the surface of the second partition wall part 10b as follows. When the second partition wall part 10b is loaded with the exhaust-gas purifying catalyst 9, the percentage of the ratio of an area S4 of the range loaded with the exhaust-gas purifying catalyst 9 to an area S3 of the surface of the second partition wall part 10b is 10% or less. Hereinafter, the "percentage (%) of the ratio of the area S4 of the region loaded with the exhaust-gas purifying catalyst 9 to the area S3 of the surface of the second partition wall part 10b" may be called a "catalyst loading area ratio (%) of the second partition wall part 10b". The catalyst loading area ratios (%) of the first partition wall part 10a and the second partition wall part 10b may be collectively called a "catalyst loading area ratio (%) of the partition wall parts 10". The "exhaust-gas purifying catalyst" may be simply called a "catalyst". The area S1 of the surface of the first partition wall parts 10a and the area S3 of the surface of the second partition wall parts 10b do not include the portions plugged with the plugging portion 5. When the polygons as the sectional shape of the cells 2 have a rounded portion at the corners of the polygons, the portions of the partition wall 1 defining these rounded corners are excluded from the calculation of the area S1 of the surface of the first partition wall parts 10a and the area S3 of the surface of the second partition wall parts 1013.

Such a configuration of the partition wall 1 defining inflow cells 2a and outflow cells 2b of the honeycomb filter 100 effectively suppresses peeling-off of PM, such as trapped soot, from the surface of the partition wall 1. This configuration therefore prevents clogging of the inflow cells 2a with PM such as peeled soot. For continuous regeneration to continuously burn the soot accumulated inside the honeycomb filter 100, the honeycomb filter 100 keeps a desired regeneration efficiency. This means that also for continuing use, the honeycomb filter of the present invention effectively suppresses deterioration of the purifying efficiency and an increase in the pressure loss.

The catalyst loading area ratio (%) of the partition wall parts 10 can be obtained by taking a two-dimensional image of the honeycomb filter 100 by X-ray CT scan and analyzing the two-dimensional image. Specifically, first, samples for measurement are cut out from the honeycomb filter 100 so as to include a plane orthogonal to the extending direction of the cells 2. The samples for measurement are prepared by cutting out at the following nine positions from the three positions of 10%, 50%, and 90% of the total length in the extending direction of the cells 2 from the inflow end face 11 of the honeycomb filter 100. That is, the total number of samples for measurement is 27. The first point of the nine sampling points for cutting out the samples for measurement from each sectional position is the center of gravity point at the sectional position of the honeycomb filter 100. The second point is the midpoint in one radial direction from this center of gravity point to the circumference of the honeycomb filter 100. The third to ninth points are the seven points that are "midpoints in the radial direction" that are moved clockwise by 45° from the above-mentioned second point. These samples for measurement may be sized to include the partition wall 1 surrounding an inflow cell 2a including each sampling point or an inflow cell 2a located closest to each sampling point. Hereinafter, "an inflow cell 2a including each sampling point or an inflow cell 2a located closest to each sampling point" in each sample for measurement is called a "measurement target inflow cell".

Next, for each sample for measurement, the range loaded with the exhaust-gas purifying catalyst 9 and the range not loaded with the exhaust-gas purifying catalyst 9 on the surface of the partition wall 1 defining the measurement target inflow cell are distinguished by the following method. The following measurements are conducted for each part of the partition wall 1 that is one side of each polygon as the sectional shape of the measurement target inflow cell. First, images of each sample for measurement are taken by X-ray CT in the range from the surface of the partition wall 1 surrounding the measurement target inflow cell to 0.1 μm at the intervals of 0.01 μm. Then, each of these X-ray CT images taken at the intervals of 0.01 μm is binarized into a portion loaded with the exhaust-gas purifying catalyst 9, a portion including the partition wall 1 alone, and a portion of the pore formed in the partition wall 1 due to a difference in brightness of the X-ray CT images, and the areas of these portions are obtained. Next, for each sample for measurement, the "area of the portions loaded with the exhaust-gas purifying catalyst 9" of the X-ray CT images taken at the intervals of 0.01 μm is summed up to obtain the "total area of the portions loaded with the exhaust-gas purifying catalyst 9" for each sample. For any X-ray CT image, the areas of the portion loaded with the exhaust-gas purifying catalyst 9, the portion including the partition wall 1 alone, and the portion of the pore formed in the partition wall 1 are summed up to calculate the "total area". The "total area" calculated in this way is the area of the surfaces of the partition wall parts 10 for each sample (i.e., the area S1' of the surfaces of the first partition wall parts 10a and the area S3' of the surfaces of the second partition wall parts 10b of each sample). The ratio of these calculated "total area of the portions loaded with the exhaust-gas purifying catalyst 9" to "total area" is the "catalyst loading area ratio (%)" of the partition wall parts 10 in one sample for measurement. The "catalyst loading area ratio (%)" of the partition wall parts 10 is calculated for each of the twenty-seven samples for measurement. The X-ray CT scan may be performed using "SMX-160CT-SV3 (trade name)" manufactured by Shimadzu Corporation, for example.

Based on the measurement results described above, the partition wall parts 10 having the catalyst loading area ratio exceeding 10% are the first partition wall parts 10a. The partition wall parts 10 having the catalyst loading area ratio of 10% or less or not loaded with the exhaust-gas purifying catalyst 9 on the surface are the second partition wall parts 10b. Whether or not the partition wall part 10 is the second partition wall part 10b can be determined as follows. First, the measurement results, which are obtained from the measurement of the catalyst loading area ratio (%) by the X-ray CT scan as described above, at each section of the three positions of 10%, 50%, and 90% of the total length of the honeycomb filter 100 are made into one set. That is, the measurement results of nine points for each section described above are made into one set, and the measurement results by X-ray CT scan are divided into the three sets. For each of the three sets, the average of the nine measurement results (catalyst loading area ratio (%)) is obtained. When the average of the catalyst loading area ratios of all of the three sets of sections is 10% or less (including 0%), this partition wall part 10 is the second partition wall part 10b.

Then a determination is made whether or not the partition wall 1 defining the inflow cells 2a includes one or more first partition wall parts 10a and one or more second partition wall parts 10b as the partition wall parts 10. In one example, the honeycomb filter 100 includes inflow cells 2a having a quadrangular sectional shape, so the partition wall 1 defining one inflow cell 2a includes four partition wall parts 10. In this case, at least one of the four partition wall parts 10 is the first partition wall part 10a, and at least another one is the second partition wall part 10b. When the partition wall parts 10 include one or more first partition wall part 10a and one or more second partition wall part 10b, the remaining partition wall part(s) 10 may be the first partition wall part 10a or the second partition wall part 10b.

Let that an inflow cell 2a defined by the partition wall 1 including one or more first partition wall parts 10a and one or more second partition wall parts 10b as the partition wall parts 10 is called a specific inflow cell 2a, the honeycomb filter 100 is preferably configured as follows. First, the measurement results on the catalyst loading area ratio (%) by the X-ray CT scan as described above are divided into three sets corresponding to the sections of the honeycomb filter 100. Preferably the measurement results of each of these three sets (nine measurement results for each) include the specific inflow cells 2a at the seven or more positions. In other words, the specific inflow cells 2a are preferably present at the ratio of 7/9 or higher in the measurement results of each section.

Whether or not the surface of the partition wall 1 defining the outflow cells 2b is loaded with the exhaust-gas purifying catalyst 9 also can be determined by the method similar to the above. The partition wall 1 defining the outflow cells 2b is preferably loaded with the exhaust-gas purifying catalyst 9 on at least a part of the surface. For example, although not particularly limited, the partition wall 1 defining the outflow cells 2b may be loaded with the exhaust-gas purifying catalyst 9 on a region of 50% or more of the surface. In this case, the catalyst loading area ratio of the surface of the partition wall 1 defining the outflow cells 2b is 50% or more. The catalyst loading area ratio of the surface of the partition wall 1 defining the outflow cells 2b is more preferably 60% or more.

In the honeycomb filter 100, the honeycomb structure body 4 serves as a catalyst carrier loaded with the exhaust-gas purifying catalyst 9. The honeycomb structure body 4 includes the porous partition wall 1 defining the plurality of cells 2, and a part of the surface of this porous partition wall 1 is loaded with the exhaust-gas purifying catalyst 9. The pores formed in the porous partition wall 1 also may be loaded with the exhaust-gas purifying catalyst 9. Hereinafter, the surface of the partition wall 1 or the pores of the porous partition wall 1 being loaded with the exhaust-gas purifying catalyst 9 may be collectively called the partition wall 1 being loaded with the exhaust-gas purifying catalyst 9.

The porosity of the partition wall 1 is not limited especially, and is preferably 30 to 80%, more preferably 35 to 75%, and particularly preferably 40 to 70%, for example. The porosity of the partition wall 1 is a value measured by mercury press-in method. The porosity of the partition wall 1 can be measured using Autopore 9500 (product name) produced by Micromeritics Co, for example. The porosity of the partition wall 1 less than 30% is not preferable because the pressure loss increases. The porosity of the partition wall 1 exceeding 80% is not preferable because the strength and the filtration efficiency deteriorate.

The partition wall 1 of the honeycomb structure body 4 preferably has a thickness of 0.13 to 0.40 mm, more preferably 0.15 to 0.36 mm, and particularly preferably 0.18 to 0.30 mm. The thickness of the partition wall 1 can be measured with a scanning electron microscope or a microscope, for example. If the thickness of the partition wall 1 is less than 0.13 mm, the strength may not be enough. If the thickness of the partition wall 1 exceeds 0.40 mm, pressure loss of the honeycomb filter 100 may increase.

The shape of the cells 2 defined by the partition wall 1 is not limited especially. For instance, the cells 2 may have a polygonal shape, a circular shape, an elliptic shape, and the like in a section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, and an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively. The cells 2 refer to a space surrounded with the partition wall 1.

Preferably the cells 2 defined by the partition wall 1 of the honeycomb structure body 4 have a cell density that is 15 to 90 cells/cm$^2$, and more preferably 30 to 60 cells/cm$^2$. The honeycomb filter 100 having this configuration suppresses increase in pressure loss while maintaining the ability of trapping PM.

The circumferential wall 3 of the honeycomb structure body 4 may be configured to be monolithic with the partition wall 1 or may be a circumference coating layer that is formed by applying a circumference coating material so as to encompass the partition wall 1. Although not shown, during the manufacturing process, the partition wall and the circumferential wall may be formed in a monolithic manner, and then the circumferential wall formed may be removed by a known method, such as grinding. Then, the circumference coating layer may be disposed on the circumferential side of the partition wall.

The shape of the honeycomb structure body 4 is not limited especially. Examples of the shape of the honeycomb structure body 4 include a pillar shape in which the inflow end face 11 and the outflow end face 12 have a shape, such as a circle, an ellipse, and a polygon.

The size of the honeycomb structure body 4, e.g., the length from the inflow end face 11 to the outflow end face 12 and the size of a section orthogonal to the extending direction of the cells 2 of the honeycomb structure body 4, is not limited especially. The size of the honeycomb filter 100 may be selected appropriately so that it can have the optimum purifying ability when it is used as a filter to purify exhaust gas. For instance, the length from the inflow end face 11 to the outflow end face 12 of the honeycomb structure body 4 is preferably 150 to 305 mm, and more preferably 150 to 200 mm.

The material of the partition wall 1 is not limited especially. For example, the partition wall 1 is preferably made of at least one type of materials selected from the group consisting of silicon carbide, cordierite, silicon-silicon carbide composite material, cordierite-silicon carbide composite material, silicon nitride, mullite, alumina, and aluminum titanate.

The material of the plugging portion 5 is also not limited especially. For example, a material similar to the material of the partition wall 1 described above may be used.

The type of the exhaust-gas purifying catalyst 9 with which the partition wall 1 is loaded is not particularly limited, and an oxidation catalyst is preferable. Examples of the oxidation catalyst include one containing noble metals. Specifically, oxidation catalyst preferably may be a catalyst including at least one type selected from the group consisting of platinum, palladium and rhodium. The oxidation catalyst is for burning and removing PM such as soot in the exhaust gas trapped and removed by the honeycomb filter 100.

(2) Honeycomb Filter (Second Embodiment)

Figure 6:
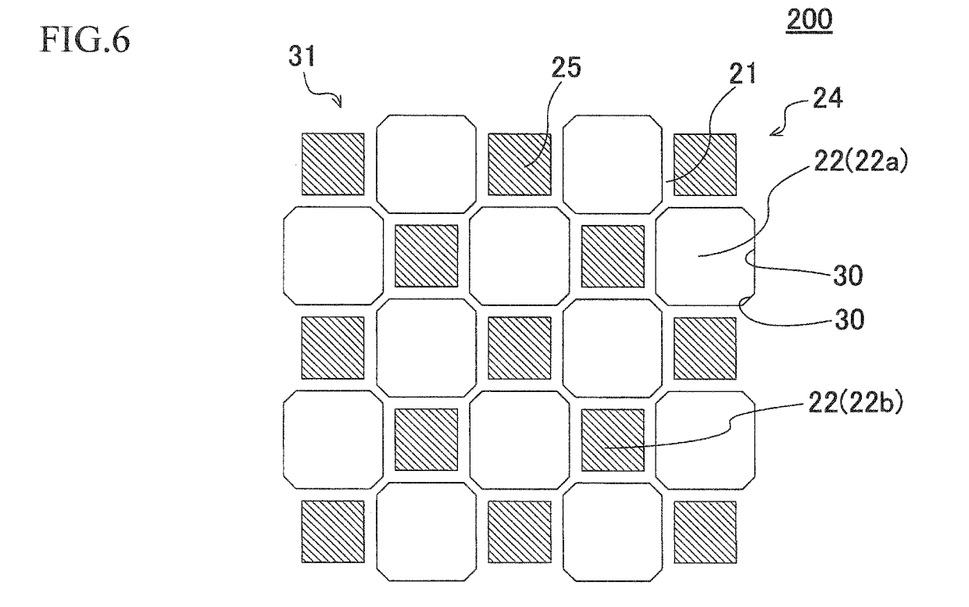
FIG. 6 is an enlarged plan view in which the inflow end face side of a second embodiment of the honeycomb filter of the present invention is enlarged.

Next the following describes a second embodiment of the honeycomb filter of the present invention. The second embodiment of the honeycomb filter of the present invention is a honeycomb filter 200 as shown in FIG. 6. FIG. 6 is an enlarged plan view showing the inflow end face side of the second embodiment of the honeycomb filter of the present invention.

As shown in FIG. 6, the honeycomb filter 200 of the present embodiment includes a honeycomb structure body 24 having a porous partition wall 21 disposed so as to surround a plurality of cells 22, and a plugging portion 25. The overall shape of the honeycomb structure body 24 can be the same as that of the honeycomb structure body 4 of the honeycomb filter 100 shown in FIGS. 1 to 5 described above. The honeycomb filter 200 of FIG. 6 is different from the honeycomb filter 100 shown in FIGS. 1 to 5 in that the sectional shapes of the cells 22 have two types of a quadrangular shape and an octagonal shape in a section orthogonal to the extending direction of the cells 22 of the honeycomb structure body 24. The sectional shape of the honeycomb structure body 24 has a repeating unit so that cells 22 having a quadrangular section and cells 22 having an octagonal section are alternately disposed via the partition wall 21.

In the honeycomb filter 200, the cells 22 having an octagonal section are inflow cells 22a and the cells 22 having a quadrangular section are outflow cells 22b. The honeycomb filter 200 is configured so that the cells 22 have a substantially constant sectional shape in the extending direction of the cells 22 from the inflow end face 31 side to the outflow end face (not shown) side of the honeycomb structure body 24. Therefore, the shape of the cells 22 on the inflow end face 31 side shown in FIG. 6 is substantially the same as the shape of the cells 22 in a section of the honeycomb structure body 24. The partition wall 21 of the honeycomb structure body 24 is appropriately loaded with exhaust-gas purifying catalyst (not shown).

In the honeycomb filter 200, the partition wall 21 defining one inflow cell 22a having an octagonal sectional shape includes eight partition wall parts 30. Then this partition wall 21 defining the inflow cell 22a includes one or more first partition wall parts (not shown) and one or more second partition wall parts (not shown) as described above. The first partition wall part has the catalyst loading area ratio exceeding 10%. The second partition wall part has the catalyst loading area ratio of 10% or less.

The honeycomb filter 200 is configured so that the partition wall 21 making up the sides of the polygon that is a sectional shape of each cell 22 includes the partition wall 21 defining two adjacent inflow cells 22a. Preferably the partition wall part 30 defining the two adjacent inflow cells 22a of this honeycomb filter 200 is the second partition wall part. That is, the partition wall part 30 defining the two adjacent inflow cells 22a preferably has the following measurement result in the measurement of the catalyst loading area ratio (%) by X-ray CT scan. When the measurement result by X-ray CT scan is divided into three sets corresponding to sections as described above, the partition wall part 30 defining the two adjacent inflow cells 22a preferably has the catalyst loading area ratio of 10% or less (including 0%) for all of the results of the sections. With such a configuration, the honeycomb filter suppresses peeling-off of soot from the surface of the partition wall 21 more effectively, and effectively suppresses a decrease in purifying efficiency and an increase in pressure loss also during the continuous use of the filter. The honeycomb filter 200 shown in FIG. 6 is preferably configured in the same manner as the honeycomb filter 100 shown in FIGS. 1 to 5 except that the sectional shapes of the inflow cells 22a and the outflow cells 22b are different.

(3) Honeycomb Filter (Third Embodiment)

Figure 7:
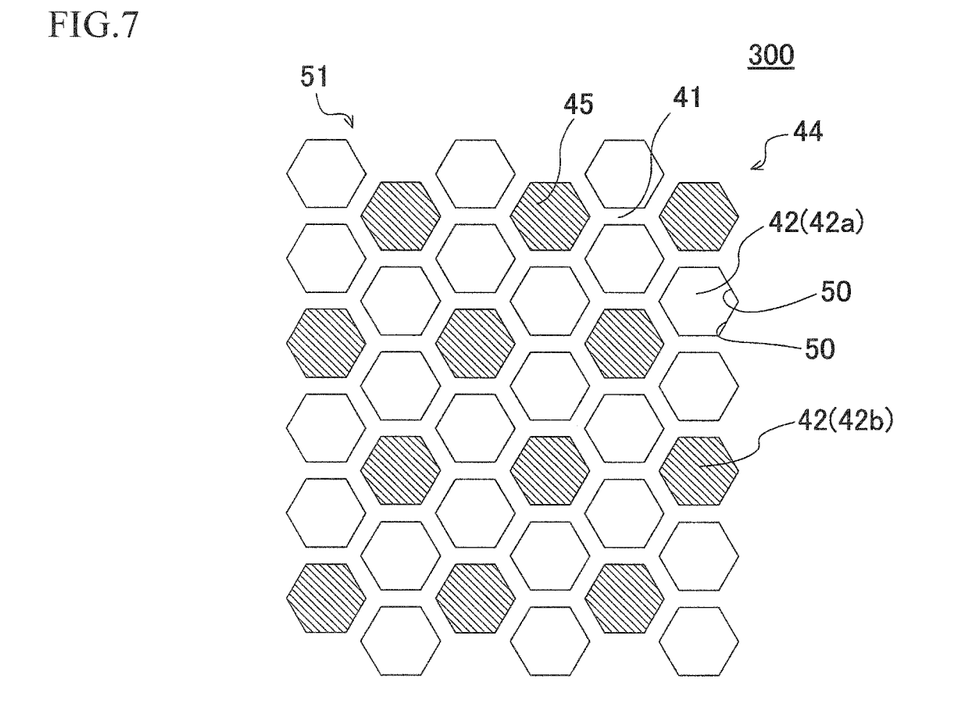
FIG. 7 is an enlarged plan view in which the inflow end face side of a third embodiment of the honeycomb filter of the present invention is enlarged.

The following describes a third embodiment of the honeycomb filter of the present invention. The third embodiment of the honeycomb filter of the present invention is a honeycomb filter 300 as shown in FIG. 7. FIG. 7 is an enlarged plan view in which the inflow end face side of the third embodiment of the honeycomb filter of the present invention is enlarged.

As shown in FIG. 7, the honeycomb filter 300 of the present embodiment includes a honeycomb structure body 44 having a porous partition wall 41 disposed so as to surround a plurality of cells 42, and a plugging portion 45. The overall shape of the honeycomb structure body 44 can be the same as that of the honeycomb structure body 4 of the honeycomb filter 100 shown in FIGS. 1 to 5 described above. The honeycomb filter 300 of FIG. 7 is different from the honeycomb filter 100 shown in FIGS. 1 to 5 in that the sectional shapes of the cells 42 are hexagonal in a section orthogonal to the extending direction of the cells 42 of the honeycomb structure body 44. That is, the sectional shape of the honeycomb structure body 44 has a repeating unit of the cells 42 having the hexagonal sectional shapes.

In the honeycomb filter 300, inflow cells 42a and outflow cells 42b are disposed so that six inflow cells 42a surround one outflow cell 42b. The honeycomb filter 300 is configured so that the cells 42 have a substantially constant sectional shape in the extending direction of the cells 42 from the inflow end face 51 side to the outflow end face (not shown) side of the honeycomb structure body 44. Therefore, the shape of the cells 42 on the inflow end face 51 side shown in FIG. 7 is substantially the same as the shape of the cells 42 in a section of the honeycomb structure body 44. The partition wall 41 of the honeycomb structure body 44 is appropriately loaded with exhaust-gas purifying catalyst (not shown).

In the honeycomb filter 300, the partition wall 41 defining one inflow cell 42a having a hexagonal sectional shape includes six partition wall parts 50. Then this partition wall 41 defining the inflow cell 42a includes one or more first partition wall parts (not shown) and one or more second partition wall parts (not shown) as described above. Preferably the partition wall part 50 defining the two adjacent inflow cells 42a of this honeycomb filter 300 is the second partition wall part. That is, when the measurement result by X-ray CT scan is divided into three sets corresponding to sections, the partition wall part 50 defining the two adjacent inflow cells 42a preferably has the catalyst loading area ratio of 10% or less (including 0%) for all of the results of the sections.

(4) Honeycomb Filter (Fourth Embodiment)

Figure 8:
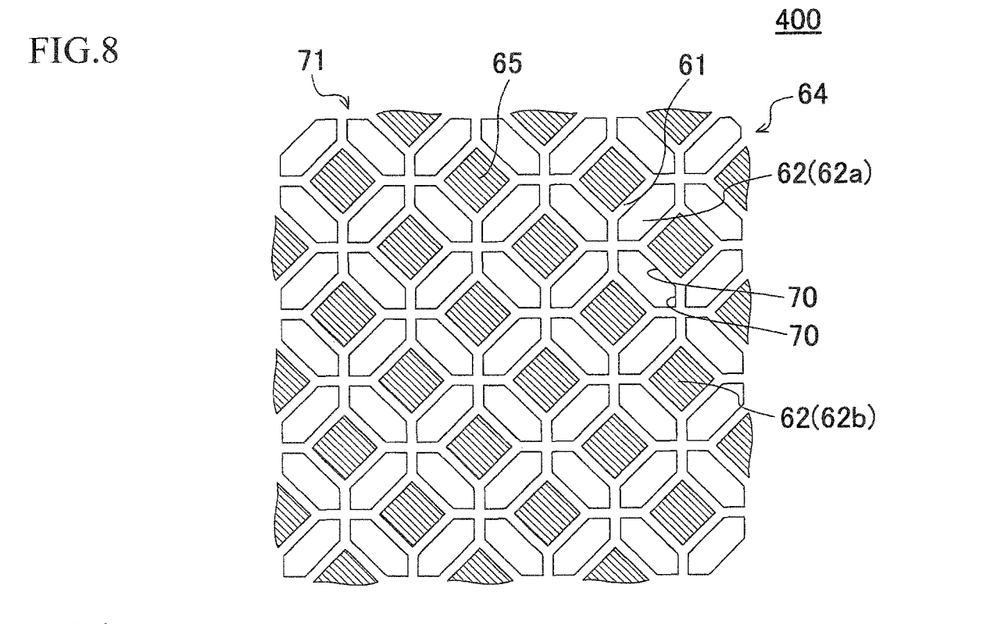
FIG. 8 is an enlarged plan view in which the inflow end face side of a fourth embodiment of the honeycomb filter of the present invention is enlarged.

Next the following describes a fourth embodiment of the honeycomb filter of the present invention. The fourth embodiment of the honeycomb filter of the present invention is a honeycomb filter 400 as shown in FIG. 8. FIG. 8 is an enlarged plan view in which the inflow end face side of the fourth embodiment of the honeycomb filter of the present invention is enlarged.

As shown in FIG. 8, the honeycomb filter 400 of the present embodiment includes a honeycomb structure body 64 having a porous partition wall 61 disposed so as to surround a plurality of cells 62, and a plugging portion 65. The overall shape of the honeycomb structure body 64 can be the same as that of the honeycomb structure body 4 of the honeycomb filter 100 shown in FIGS. 1 to 5 described above. The honeycomb filter 400 of FIG. 8 is different from the honeycomb filter 100 shown in FIGS. 1 to 5 in that the sectional shapes of the cells 62 have two types of a quadrangular shape and a hexagonal shape in a section orthogonal to the extending direction of the cells 62 of the honeycomb structure body 64.

In this honeycomb filter 400, the sectional shape of the honeycomb structure body 64 has a repeating unit so that four inflow cells 62a each having a hexagonal sectional shape surround an outflow cell 62b having a quadrangular sectional shape. The honeycomb filter 400 is configured so that the cells 62 have a substantially constant sectional shape in the extending direction of the cells 62 from the inflow end face 71 side to the outflow end face (not shown) side of the honeycomb structure body 64. Therefore, the shape of the cells 62 on the inflow end face 71 side shown in FIG. 8 is substantially the same as the shape of the cells 62 in a section of the honeycomb structure body 64. The partition wall 61 of the honeycomb structure body 64 is appropriately loaded with exhaust-gas purifying catalyst (not shown).

In the honeycomb filter 400, the partition wall 61 defining one inflow cell 62a having a hexagonal sectional shape includes six partition wall parts 70. Then, this partition wall 61 defining the inflow cell 62a includes one or more first partition wall parts (not shown) and one or more second partition wall parts (not shown) as described above. Preferably the partition wall part 70 defining the two adjacent inflow cells 62a of this honeycomb filter 400 is the second partition wall part. That is, when the measurement result by X-ray CT scan is divided into three sets corresponding to sections, the partition wall part 70 defining the two adjacent inflow cells 62a preferably has the catalyst loading area ratio of 10% or less (including 0%) for all of the results of the sections.

(5) Honeycomb Filter (Fifth Embodiment)

Figure 9:
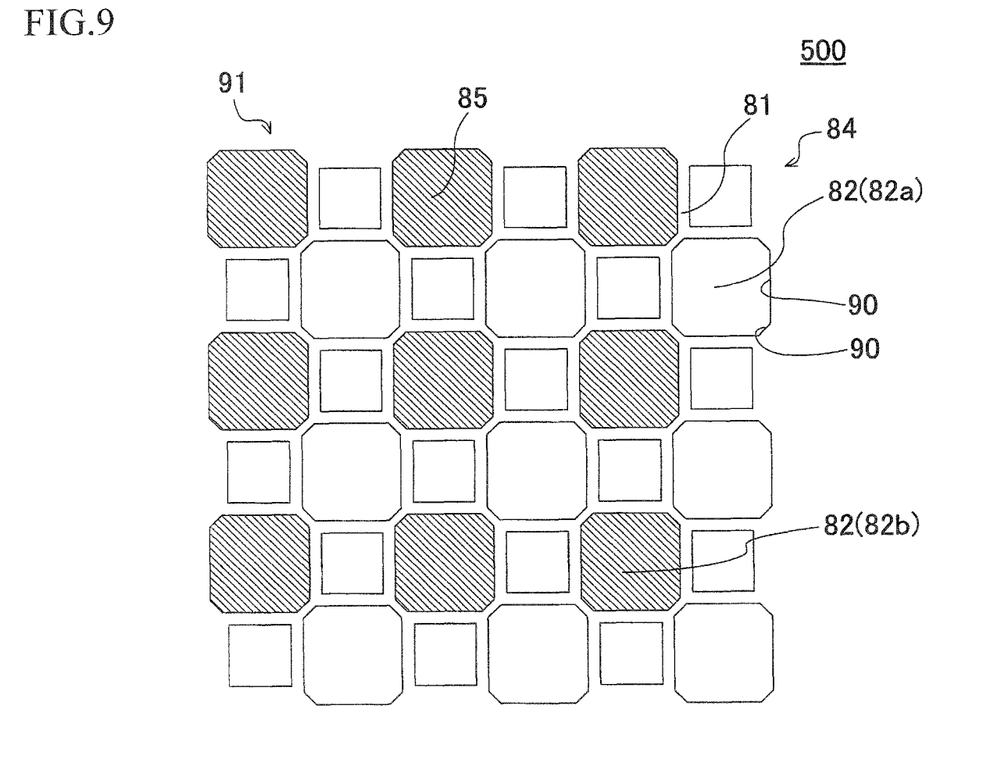
FIG. 9 is an enlarged plan view in which the inflow end face side of a fifth embodiment of the honeycomb filter of the present invention is enlarged.

The following describes a fifth embodiment of the honeycomb filter of the present invention. The fifth embodiment of the honeycomb filter of the present invention is a honeycomb filter 500 as shown in FIG. 9. FIG. 9 is an enlarged plan view in which the inflow end face side of the fifth embodiment of the honeycomb filter of the present invention is enlarged.

As shown in FIG. 9, the honeycomb filter 500 of the present embodiment includes a honeycomb structure body 84 having a porous partition wall 81 disposed so as to surround a plurality of cells 82, and a plugging portion 85. The overall shape of the honeycomb structure body 84 can be the same as that of the honeycomb structure body 4 of the honeycomb filter 100 shown in FIGS. 1 to 5 described above. The honeycomb filter 500 of FIG. 9 is different from the honeycomb filter 100 shown in FIGS. 1 to 5 in that the sectional shapes of the cells 82 have two types of a quadrangular shape and an octagonal shape in a section orthogonal to the extending direction of the cells 82 of the honeycomb structure body 84. The honeycomb structure body 84 has a repeating unit so that cells 82 having a quadrangular section and cells 82 having an octagonal section are alternately disposed via the partition wall 81.

In the honeycomb filter 500, inflow cells 82a and outflow cells 82b are disposed so that eight inflow cells 82a each having a quadrangular or octagonal sectional shape surround an outflow cell 82b having an octagonal sectional shape. The honeycomb filter 500 is configured so that the cells 82 have a substantially constant sectional shape in the extending direction of the cells 82 from the inflow end face 91 side to the outflow end face (not shown) side of the honeycomb structure body 84. Therefore, the shape of the cells 82 on the inflow end face 91 side shown in FIG. 9 is substantially the same as the shape of the cells 82 in a section of the honeycomb structure body 84. The partition wall 81 of the honeycomb structure body 84 is appropriately loaded with exhaust-gas purifying catalyst (not shown).

In the honeycomb filter 500, the partition wall 81 defining one inflow cell 82a having a quadrangular sectional shape includes four partition wall parts 90. The partition wall 81 defining one inflow cell 82a having an octagonal sectional shape includes eight partition wall parts 90. Then this partition wall 81 defining these inflow cell 82a includes one or more first partition wall parts (not shown) and one or more second partition wall parts (not shown) as described above. Preferably the partition wall part 90 defining the two adjacent inflow cells 82a of this honeycomb filter 500 is the second partition wall part. That is, when the measurement result by X-ray CT scan is divided into three sets corresponding to sections, the partition wall part 90 defining the two adjacent inflow cells 82a preferably has the catalyst loading area ratio of 10% or less (including 0%) for all of the results of the sections.

Preferably the honeycomb filters 300, 400 and 500 shown in FIGS. 7 to 9 are configured in the same manner as the honeycomb filter 100 shown in FIGS. 1 to 5 except that the sectional shapes of the cells 42, 62, and 82 are different.

(6) Method for Manufacturing Honeycomb Filter

A method for manufacturing the honeycomb filter of the present invention is not limited especially, and the honeycomb filter can be manufactured by the following method, for example. Firstly, a plastic kneaded material is prepared to produce a honeycomb structure body. The kneaded material to produce a honeycomb structure body can be prepared by adding additives, such as binder, pore former and water as needed to a material selected as raw material powder from the aforementioned materials suitable for the partition wall.

Next, the prepared kneaded material is extruded, thereby producing a pillar-shaped honeycomb formed body having a partition wall defining a plurality of cells and a circumferential wall provided to encompass this partition wall. Next, the obtained honeycomb formed body is dried by microwaves and hot air, for example.

Next, a plugging portion is provided at the open ends of the cells of the dried honeycomb formed body. Specifically, a plugging material is prepared first, which includes a raw material to form the plugging portion, for example. Next, a mask is applied to the inflow end face of the honeycomb formed body so as to cover the inflow cells. Next, the open ends of the outflow cells without the mask on the inflow end face side of the honeycomb formed body is filled with the prepared plugging material. After that, the outflow end face of the honeycomb formed body also is filled with the plugging material at the open ends of the inflow cells similarly to the above.

Next, the honeycomb formed body having the plugging portion at any one of the open ends of each cell is fired to produce a honeycomb fired body that is a honeycomb filter before loading with catalyst. Temperatures and atmosphere for the firing differ according to the raw material, and those skilled in the art can select the temperature and atmosphere for the firing that are the most suitable for the selected material.

Next, the prepared honeycomb fired body is loaded with an exhaust-gas purifying catalyst. A catalyst slurry including the exhaust-gas purifying catalyst can be prepared appropriately by a conventionally known method.

Next, the catalyst slurry is introduced into the honeycomb fired body from the outflow end face side, so that the partition wall defining the outflow cells of the honeycomb fired body is loaded with the exhaust-gas purifying catalyst. When the sectional shape of the cells is quadrangular as shown in FIGS. 1 to 5 and when the sectional shape of the cells is hexagonal as shown in FIG. 7, the catalyst slurry may be selectively introduced into the outflow cells. Then, the loading amount of the catalyst and the loading range of the catalyst are adjusted partially so that the partition wall defining the inflow cells includes the first partition wall part having the catalyst loading area ratio exceeding 10% and the second partition wall part having the catalyst loading area ratio of 10% or less. The outflow end face side of the honeycomb fired body may be brought into contact with the liquid surface of the catalyst slurry, and the interior of the honeycomb fired body may be sucked from the inflow end face side of the honeycomb fired body to suck the catalyst slurry into the honeycomb fired body and so introduce the catalyst slurry into the outflow cells. During suction, the suction time, for example, is adjusted so that the catalyst does not reach the inflow end face side, whereby the load amount of the catalyst and the loading range of the catalyst are adjusted for the partition wall defining the inflow cells.

Preferably, in the configuration of the honeycomb fired body including the partition wall defining two adjacent inflow cells, catalyst is loaded by sucking the honeycomb fired body from the inflow end face side to introduce the catalyst slurry into the outflow cells as described above. That is, the partition wall defining two inflow cells is less likely to receive negative pressure during the suction, and so is less likely to be sucked than the partition wall defining an inflow cell and an outflow cell. Therefore, the loading amount of the catalyst and the loading range of the catalyst can be adjusted partially so that the partition wall defining the inflow cells includes the first partition wall part having the catalyst loading area ratio exceeding 10% and the second partition wall part having the catalyst loading area ratio of 10% or less. During suction, the suction time and the like is preferably adjusted so that the catalyst does not reach the inflow end face side. The catalyst slurry may be introduced into the honeycomb fired body placed horizontally to adjust the loading amount of the catalyst and the loading range of the catalyst partially.

EXAMPLES

The following describes the present invention more specifically by way of examples, and the present invention is by no means limited to these examples.

Example 1

Talc, kaolin, alumina, silica, and aluminum hydroxide were prepared and mixed to obtain a cordierite forming raw material. The cordierite fainting raw material included these talc, kaolin, alumina, silica, and aluminum hydroxide formulated with a predetermined ratio to have a chemical composition of 42 to 56 mass % of $SiO_2$, 30 to 45 mass % of $Al_2O_3$, and 12 to 16 mass % of MgO.

Next, a pore former, methyl cellulose as binder, and water as a dispersing medium were added to the obtained cordierite forming raw material, and these were mixed to obtain a forming raw material. 5 parts by mass of the pore former relative to 100 parts by mass of the cordierite forming raw material was added. 5 parts by mass of the binder relative to 100 parts by mass of the cordierite faulting raw material was added. 37 parts by mass of the dispersing medium relative to 100 parts by mass of the cordierite forming raw material was added.

Next, the kneaded material was extruded using a die for manufacturing of a honeycomb formed body to have a honeycomb formed body having a round pillar shape as the overall shape. The cells of the honeycomb formed body had a quadrangular shape.

Next, this honeycomb formed body was dried by a microwave dryer, and then was dried completely by a hot-air drier, and then both end faces of the honeycomb formed body were cut so as to have predetermined dimensions.

Next, a plugging material was prepared to form the plugging portion. Next, mask was applied to cover the inflow end cells on the inflow end face of the honeycomb formed body, and the open ends of the outflow cells without the mask on the inflow end face side of the honeycomb formed body were filled with the plugging material prepared in advance to form the plugging portion. After that, the outflow end face of the honeycomb formed body also was filled with the plugging material at the open ends of the inflow cells similarly to the above to form the plugging portion.

Next, the honeycomb formed body having the plugging portion was degreased and fired to manufacture a honeycomb fired body, which is a honeycomb filter before loading with catalyst.

Next, catalyst slurry including an exhaust-gas purifying catalyst was prepared, and the catalyst slurry was introduced into the honeycomb fired body from the outflow end face side, so that the partition wall defining the outflow cells of the honeycomb fired body was loaded with the catalyst. Specifically, the outflow end face side of the honeycomb fired body was brought into contact with the liquid surface of the catalyst slurry, and the interior of the honeycomb fired body was sucked from the inflow end face side of the honeycomb fired body to suck the catalyst slurry into the honeycomb fired body and so introduce the catalyst slurry into the outflow cells.

In this way, the honeycomb filter of Example 1 was manufactured. The honeycomb filter of Example 1 had a round pillar shape, where the inflow end face and the outflow end face were round. The inflow end face and the outflow end face had the diameter of 229 mm. The honeycomb structure had the length in the extending direction of the cell of 203 mm. The honeycomb filter of Example 1 had the thickness of the partition wall of 0.3 mm, the porosity of the partition wall of 48%, and the cell density of 47 cells/$cm^2$. The porosity of the partition wall is a value measured before loading with the catalyst. The porosity of the partition wall was measured using Autopore 9500 (product name) produced by Micromeritics. Table 1 shows the thickness of the partition wall, the porosity of the partition wall, and the cell density of the honeycomb filter. In Table 1, the fields of "inflow cell" and "outflow cell" in "sectional shape of cell" show the sectional shapes of these cells. The field of "ref. drawing" of Table 1 shows the number of drawings to be referred to for the sectional shape of the cells in Examples.

The catalyst loading state of the honeycomb filter of Example 1 was measured. Table 2 shows the result. In Table 2, "In-In" in the field of "type of 2nd partition wall part" in the "2nd partition wall part" shows that the second partition wall part defines two inflow cells. "In-Out" shows that the second partition wall part defines an inflow cell and an outflow cell. "Both" shows the case of the second partition wall part including both the partition wall defining two inflow cells and the partition wall defining an inflow cell and an outflow cell.

For the honeycomb filter of Example 1, "soot peeling-off test" and "regeneration efficiency test" were conducted by the following method. Table 3 shows the result.

[Soot Peeling-Off Test]

In this soot peeling-off test, whether or not soot peeled off was evaluated by the following method. While flowing high-temperature gas through a honeycomb filter from the inflow end face, having 6 g/L of soot accumulated at the partition wall, continuous regeneration of the filter was conducted. The conditions for regeneration were that the gas temperature at the inflow end face was 500° C. and the time for flowing gas was 10 minutes. After that, the honeycomb filter was removed from the apparatus for continuous regeneration, and water was sprayed to the honeycomb filter with a spray to give sufficient moisture to the honeycomb structure body. Next, the honeycomb filter was placed in an electric furnace preheated to 130° C., and was held for 2 hours and taken out. The honeycomb filter was sliced evenly at three locations of 10%, 50%, and 90% of the total length in the extending direction of the cells. Then, the soot peeling-off state was observed at each of the following nine points for each of the sliced sections. The first observing point of the nine observing points for each section was the center of gravity point in the section of the honeycomb filter. The second observing point was the midpoint in one radial direction from the above-mentioned center of gravity point to the circumference of the honeycomb filter. The third to ninth observing points were the seven points that were midpoints in the radial direction that were moved clockwise by 45° from the above-mentioned second observing point. Soot peeling-off was observed at the partition wall surrounding an inflow cell including each observing point or an inflow cell located closest to each observing point. For observation of an inflow cell about the soot peeling-off, when no soot peeling-off was observed at least at one surface of the partition wall surrounding the inflow cell, the honeycomb filter was accepted (passed the test). In the case other than this, that is, when soot peeling-off was observed at all the surfaces of the partition wall surrounding the inflow cell during observation, the honeycomb filter was rejected (failed the test).

[Regeneration Efficiency Test]

While flowing high-temperature gas through a honeycomb filter from the inflow end face, having 6 g/L of soot accumulated at the partition wall, forced regeneration of the filter was conducted. The conditions for forced regeneration were that the gas temperature at the inflow end face was 650° C. and the time for flowing gas was 15 minutes. Before the forced regeneration, the mass of the honeycomb filter having soot accumulated was measured. After the forced regeneration, the mass of the honeycomb filter was measured, and the mass of the soot lost by the forced regeneration was obtained. The regeneration efficiency (M2/M1× 100%) was obtained from mass M1 of the accumulated soot and mass M2 of the soot lost by forced regeneration. The honeycomb filters of Comparative Examples 2, 4, 6, 8, and 10 described later are "Base honeycomb filters". Let that the regeneration efficiency of these base honeycomb filters is P1 and the regeneration efficiency of the honeycomb filter to be evaluated is P2, the regeneration efficiency reduction rate ((P1−P2)/P1×100%) was obtained. The base honeycomb filter of Examples 1 to 3 and Comparative Example 1 is Comparative Example 2. The base honeycomb filter of Examples 4 and 5 and Comparative Example 3 is Comparative Example 4. The base honeycomb filter of Examples 6 and 7 and Comparative Example 5 is Comparative Example 6. The base honeycomb filter of Examples 8 and 9 and Comparative Example 7 is Comparative Example 8. The base honeycomb filter of Examples 10 and 11 and Comparative Example 9 is Comparative Example 10. When the regeneration efficiency reduction rate is within 10%, the honeycomb filter was evaluated as "A". When it was 10% or more, the honeycomb filter was evaluated as "B". The honeycomb filter evaluated as "A" was acceptable (passed the test). Table 3 shows the result.

TABLE 1

| | total diameter (mm) | length (mm) | partition wall thickness (mm) | cell density (cells/cm$^2$) | porosity (%) | sectional shape of cell inflow cell | outflow cell | ref. drawing |
|---|---|---|---|---|---|---|---|---|
| Ex. 1 | 229 | 203 | 0.3 | 47 | 48 | quadrangle | quadrangle | FIG. 2 |
| Ex. 2 | 229 | 203 | 0.3 | 47 | 48 | quadrangle | quadrangle | FIG. 2 |
| Ex. 3 | 229 | 203 | 0.3 | 47 | 41 | quadrangle | quadrangle | FIG. 2 |
| Comp. Ex. 1 | 229 | 203 | 0.3 | 47 | 48 | quadrangle | quadrangle | FIG. 2 |
| Comp. Ex. 2 | 229 | 203 | 0.3 | 47 | 48 | quadrangle | quadrangle | FIG. 2 |
| Ex. 4 | 229 | 203 | 0.3 | 47 | 48 | octagon | quadrangle | FIG. 6 |
| Ex. 5 | 229 | 203 | 0.3 | 47 | 41 | octagon | quadrangle | FIG. 6 |
| Comp. Ex. 3 | 229 | 203 | 0.3 | 47 | 48 | octagon | quadrangle | FIG. 6 |
| Comp. Ex. 4 | 229 | 203 | 0.3 | 47 | 48 | octagon | quadrangle | FIG. 6 |
| Ex. 6 | 229 | 203 | 0.3 | 47 | 48 | hexagon | hexagon | FIG. 7 |
| Ex. 7 | 229 | 203 | 0.3 | 47 | 48 | hexagon | hexagon | FIG. 7 |
| Comp. Ex. 5 | 229 | 203 | 0.3 | 47 | 48 | hexagon | hexagon | FIG. 7 |
| Comp. Ex. 6 | 229 | 203 | 0.3 | 47 | 48 | hexagon | hexagon | FIG. 7 |
| Ex. 8 | 229 | 203 | 0.3 | 47 | 48 | hexagon | quadrangle | FIG. 8 |
| Ex. 9 | 229 | 203 | 0.3 | 47 | 48 | hexagon | quadrangle | FIG. 8 |
| Comp. Ex. 7 | 229 | 203 | 0.3 | 47 | 48 | hexagon | quadrangle | FIG. 8 |
| Comp. Ex. 8 | 229 | 203 | 0.3 | 47 | 48 | hexagon | quadrangle | FIG. 8 |
| Ex. 10 | 229 | 203 | 0.3 | 47 | 48 | quadrangle, octagon | octagon | FIG. 9 |
| Ex. 11 | 229 | 203 | 0.3 | 47 | 48 | quadrangle, octagon | octagon | FIG. 9 |
| Comp. Ex. 9 | 229 | 203 | 0.3 | 47 | 48 | quadrangle, octagon | octagon | FIG. 9 |
| Comp. Ex. 10 | 229 | 203 | 0.3 | 47 | 48 | quadrangle, octagon | octagon | FIG. 9 |

TABLE 2

| | partition wall defining inflow cells | | | | | partition wall defining outflow cells | partition wall defining inflow cells (2) | | | |
|---|---|---|---|---|---|---|---|---|---|---|
| | 1st partition wall part | | 2nd partition wall part | | | | 1st partition wall part | | 2nd partition wall part | |
| | partition wall part total (pieces) | number (pieces) | catalyst loading area ratio (%) | number (pieces) | catalyst loading area ratio (%) | type of 2nd partition wall part | catalyst loading area ratio (%) | partition wall part total (pieces) | number (pieces) | catalyst loading area ratio (%) | number (pieces) | catalyst loading area ratio (%) |
| Ex. 1 | 4 | 2 | 60 | 2 | 5 | In-Out | 60 | — | — | — | — | — |
| Ex. 2 | 4 | 3 | 70 | 1 | 5 | In-Out | 70 | — | — | — | — | — |
| Ex. 3 | 4 | 2 | 60 | 2 | 0 | In-Out | 70 | — | — | — | — | — |
| Comp. Ex. 1 | 4 | 0 | — | 4 | 5 | both | 60 | — | — | — | — | — |
| Comp. Ex. 2 | 4 | 4 | 60 | 0 | — | — | 60 | — | — | — | — | — |
| Ex. 4 | 8 | 4 | 60 | 4 | 5 | In-Out | 60 | — | — | — | — | — |
| Ex. 5 | 8 | 4 | 70 | 4 | 5 | In-Out | 80 | — | — | — | — | — |

TABLE 2-continued

| | partition wall defining inflow cells | | | | | partition wall defining outflow cells | partition wall defining inflow cells (2) | | | | |
|---|---|---|---|---|---|---|---|---|---|---|---|
| | | 1st partition wall part | | 2nd partitition wall part | | | | 1st partition wall part | | 2nd partition wall part | |
| | partition wall part total (pieces) | number (pieces) | catalyst loading area ratio (%) | number (pieces) | catalyst loading area ratio (%) | type of 2nd partition wall part | catalyst loading area ratio (%) | partition wall part total (pieces) | number (pieces) | catalyst loading area ratio (%) | number (pieces) | catalyst loading area ratio (%) |
| Comp. Ex. 3 | 8 | 0 | — | 8 | 5 | both | 60 | — | — | — | — | — |
| Comp. Ex. 4 | 8 | 8 | 60 | 0 | — | — | 60 | — | — | — | — | — |
| Ex. 6 | 6 | 3 | 60 | 3 | 5 | In-In | 60 | — | — | — | — | — |
| Ex. 7 | 6 | 3 | 60 | 3 | 5 | In-In | 70 | — | — | — | — | — |
| Comp. Ex. 5 | 6 | 0 | — | 6 | 5 | both | 60 | — | — | — | — | — |
| Comp. Ex. 6 | 6 | 6 | 60 | 0 | — | — | 60 | — | — | — | — | — |
| Ex. 8 | 6 | 2 | 60 | 4 | 5 | In-In | 60 | — | — | — | — | — |
| Ex. 9 | 6 | 2 | 70 | 4 | 5 | In-In | 80 | — | — | — | — | — |
| Comp. Ex. 7 | 6 | 0 | — | 6 | 5 | both | 60 | — | — | — | — | — |
| Comp. Ex. 8 | 6 | 6 | 60 | 0 | — | — | 60 | — | — | — | — | — |
| Ex. 10 | 4 | 2 | 60 | 2 | 10 | In-In | 60 | 8 | 4 | 70 | 4 | 5 |
| Ex. 11 | 4 | 2 | 60 | 2 | 0 | In-In | 70 | 8 | 4 | 70 | 4 | 5 |
| Comp. Ex. 9 | 4 | 0 | — | 4 | 5 | both | 60 | 8 | 0 | — | 8 | 5 |
| Comp. Ex. 10 | 4 | 4 | 60 | 0 | — | — | 60 | 8 | 8 | 60 | 0 | — |

TABLE 3

| | soot peeling-off test | regeneration efficiency test |
|---|---|---|
| Ex. 1 | pass | A (pass) |
| Ex. 2 | pass | A (pass) |
| Ex. 3 | pass | A (pass) |
| Comp. Ex. 1 | pass | B (fail) |
| Comp. Ex. 2 | fail | base |
| Ex. 4 | pass | A (pass) |
| Ex. 5 | pass | A (pass) |
| Comp. Ex. 3 | pass | B (fail) |
| Comp. Ex. 4 | fail | base |
| Ex. 6 | pass | A (pass) |
| Ex. 7 | pass | A (pass) |
| Comp. Ex. 5 | pass | B (fail) |
| Comp. Ex. 6 | fail | base |
| Ex. 8 | pass | A (pass) |
| Ex. 9 | pass | A (pass) |
| Comp. Ex. 7 | pass | B (fail) |
| Comp. Ex. 8 | fail | base |
| Ex. 10 | pass | A (pass) |
| Ex. 11 | pass | A (pass) |
| Comp. Ex. 9 | pass | B (fail) |
| Comp. Ex. 10 | fail | base |

Examples 2 to 11, Comparative Examples 1 to 10

The honeycomb filters of Examples 2 to 11 and Comparative Examples 1 to 10 were manufactured similarly to Example 1 except that their configurations were as shown in Table 1 and Table 2. For the honeycomb filters of Examples 2 to 11 and Comparative Examples 1 to 10, the "soot peeling-off test" and the "regeneration efficiency test" were conducted. Table 3 shows the result.
(Result)

The honeycomb filters of Examples 1 to 11 had good results for both the "soot peeling-off test" and the "regeneration efficiency test". The honeycomb filters of Comparative Examples 2, 4, 6, 8, and 10 had peeling-off of soot at all of the surface of the partition wall to be observed in the "soot peeling-off test". The honeycomb filters of Comparative Examples 1, 3, 5, 7, and 9 were rejected in the "regeneration efficiency test".

The honeycomb filter of the present invention can be used as a filter to trap particulate matter in exhaust gas.

DESCRIPTION OF REFERENCE NUMERALS

1, 21, 41, 61, 81: Partition wall, 2, 22, 42, 62, 82: Cell, 2a, 22a, 42a, 62a, 82a: Inflow cell, 2b, 22b, 42b, 62b, 82b: Outflow cell, 3: Circumferential wall, 4, 24, 44, 64, 84: Honeycomb structure body, 5, 25, 45, 65, 85: Plugging portion, 9: Exhaust-gas purifying catalyst, 10, 30, 50, 70, 90: Partition wall part, 10a: First partition wall part, 10b: Second partition wall part, 11, 31, 51, 71, 91: Inflow end face, 12: Outflow end face, 100, 200, 300, 400, 500, 900: Honeycomb filter, 101: Partition wall, 102: Cell, 109: Soot, S1: Area (area of surface of first partition wall part), S2: Area (area of range loaded with exhaust-gas purifying catalyst), S3: Area (area of surface of second partition wall part), S4: Area (area of range loaded with exhaust-gas purifying catalyst)

What is claimed is:
1. A honeycomb filter comprising: a pillar-shaped honeycomb structure body having a porous partition wall disposed so as to surround a plurality of cells, which serve as fluid through channel extending from an inflow end face to an outflow end face; and a plugging portion disposed so as to plug end at any one of the inflow end face side and at the outflow end face side of the cells, wherein
   the cells each have a sectional shape that is a polygon in a section orthogonal to an extending direction of the cells of the honeycomb structure body,
   the cells having the plugging portion at ends on the outflow end face side and that are open on the inflow end face side are inflow cells,
   the cells having the plugging portion at ends on the inflow end face side and that are open on the outflow end face side are outflow cells,
   at least a part of a surface of the partition wall defining the outflow cells is loaded with exhaust-gas purifying catalyst,
   the partition wall defining the inflow cells includes a plurality of partition wall parts making up sides of the polygon that is the sectional shape of each cell, the partition wall parts each having a surface that is a face defining the inflow cell, the partition wall part is either a first partition wall part or a second partition wall part, the first partition wall part is loaded with the exhaust-gas purifying catalyst on the surface of the first partition wall part so that a percentage of a ratio of an area $S2$ of a range loaded with the exhaust-gas purifying catalyst to an area $S1$ of the surface of the first partition wall part exceeds 11%, the second partition wall part is not loaded with the exhaust-gas purifying catalyst on the surface of the second partition wall part, or is loaded with the exhaust-gas purifying catalyst so that a percentage of a ratio of an area $S4$ of a range loaded with the exhaust-gas purifying catalyst to an area $S3$ of the surface of the second partition wall part is 10% or less, and the partition wall defining each of the inflow cells is configured to include one or more of the first partition wall parts and one or more of the second partition wall parts as the partition wall parts.

2. The honeycomb filter according to claim 1, wherein the partition wall making up sides of the polygon that is the sectional shape of each cell includes a partition wall defining two adjacent inflow cells.

3. The honeycomb filter according to claim 1, wherein, in the honeycomb structure body, (i) the inflow cells have an octagonal shape and the outflow cells have a quadrangular shape, and the inflow cells and outflow cells are alternately disposed via the partition wall in a repeating unit, (ii) the inflow cells and the outflow cells have a hexagonal shape, and six inflow cells surround one outflow cell in a repeating unit, or (iii) the inflow cells have a hexagonal shape and the outflow cells have a quadrangular shape, and four inflow cells surround one outflow cell in a repeating unit.

4. The honeycomb filter according to claim 1, wherein, in the honeycomb structure body, the inflow cells have a quadrangular or octagonal shape and the outflow cells have an octagonal shape, and eight inflow cells surround one outflow cell in a repeating unit.

* * * * *